(12) United States Patent
Luo et al.

(10) Patent No.: US 8,917,614 B2
(45) Date of Patent: Dec. 23, 2014

(54) RESOURCE ALLOCATION AND TRANSMISSION FOR COORDINATED MULTI-POINT TRANSMISSION

(75) Inventors: Tao Luo, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 13/020,737

(22) Filed: Feb. 3, 2011

(65) Prior Publication Data

US 2012/0033624 A1 Feb. 9, 2012

Related U.S. Application Data

(60) Provisional application No. 61/302,038, filed on Feb. 5, 2010.

(51) Int. Cl.

| | |
|---|---|
| G08C 15/00 | (2006.01) |
| H04W 4/00 | (2009.01) |
| H04J 4/00 | (2006.01) |
| H04L 5/00 | (2006.01) |
| H04W 72/12 | (2009.01) |
| H04B 7/02 | (2006.01) |
| H04B 7/04 | (2006.01) |
| H04L 1/16 | (2006.01) |
| H04L 1/00 | (2006.01) |

(52) U.S. Cl.
CPC .......... H04L 5/0094 (2013.01); H04L 5/0042 (2013.01); H04B 7/0452 (2013.01); H04W 72/1205 (2013.01); H04L 5/001 (2013.01); H04B 7/0417 (2013.01); H04L 5/0035 (2013.01); H04L 1/1607 (2013.01); H04B 7/024 (2013.01); H04W 72/1289 (2013.01); H04L 1/0003 (2013.01)

USPC ........ 370/252; 370/329; 370/395.21; 370/478

(58) Field of Classification Search
None
See application file for complete search history.

(56) References Cited

U.S. PATENT DOCUMENTS

| | | | |
|---|---|---|---|
| 2008/0014951 A1 | 1/2008 | Laroia et al. | |
| 2008/0259802 A1 | 10/2008 | Pedersen et al. | |
| 2010/0027471 A1* | 2/2010 | Palanki et al. | 370/328 |
| 2010/0067604 A1* | 3/2010 | Bhadra et al. | 375/267 |
| 2010/0195599 A1* | 8/2010 | Zhang et al. | 370/329 |
| 2010/0238821 A1* | 9/2010 | Liu et al. | 370/252 |
| 2010/0331030 A1* | 12/2010 | Nory et al. | 455/509 |
| 2011/0034175 A1* | 2/2011 | Fong et al. | 455/450 |
| 2011/0075611 A1* | 3/2011 | Choi | 370/329 |

(Continued)

FOREIGN PATENT DOCUMENTS

| | | |
|---|---|---|
| JP | 2011082709 A | 4/2011 |
| WO | 2008115003 A2 | 9/2008 |

OTHER PUBLICATIONS

U.S. Appl. No. 61/210,291, Liu et al., Mar. 17, 2009, paragraph [020].*
U.S. Appl. No. 61/184,314, Koo et al., Jun. 5, 2009, pp. 4-14.*

(Continued)

*Primary Examiner* — Ashley Shivers

(57) ABSTRACT

Methods, apparatuses and articles of manufacture are disclosed that provide for partial downlink and uplink resource allocations among cooperating cells in a CoMP transmission to a user equipment. The resource allocation can be based on channel conditions and differing capabilities and restrictions of cooperating cells such as in support of heterogeneous network configurations.

61 Claims, 13 Drawing Sheets

(56) References Cited

U.S. PATENT DOCUMENTS

| | | | |
|---|---|---|---|
| 2011/0176502 A1* | 7/2011 | Chung et al. | 370/329 |
| 2011/0222501 A1* | 9/2011 | Kim et al. | 370/329 |
| 2011/0243085 A1* | 10/2011 | Seo et al. | 370/329 |
| 2012/0002635 A1* | 1/2012 | Chung et al. | 370/329 |
| 2012/0082058 A1* | 4/2012 | Gerstenberger et al. | 370/252 |
| 2012/0087273 A1* | 4/2012 | Koo et al. | 370/252 |
| 2012/0176887 A1* | 7/2012 | Mcbeath et al. | 370/216 |

OTHER PUBLICATIONS

U.S. Appl. No. 61/243,795, Mcbeath et al., Sep. 18, 2009, paragraphs [0043]-[0044].*

U.S. Appl. No. 61/082,827, Chung et al., Jul. 22, 2008, pp. 4-5.*

Cho H. et al., "WLC25-6: Greedy-Coordinated Scheduling with Resource-Sharing Constraints in Wireless Networks", Global Telecommunications Conference, 2006 GLOBECOM. '06 IEEE, IEEE, PI, Nov. 1, 2006, pp. 1-5, XP031075764, ISBN: 978-1-4244-0356-1.

Huawei, et al., "Further Discussions on the Downlink Coordinated Transmission—Impact on the Radio Interface", 3GPP Draft, R1-090129 Further Discussions on Downlink Coordinated Transmission, 3rd Generation Partnership Project (3GPP), Mobile Competence Centre, 650, Route Des Lucioles, F-06921 Sophia-Antipolis Cedex, France, no Ljubljana, Jan. 7, 2009, XP050318067.

International Search Report and Written Opinion—PCT/US2011/023807, ISA/EPO—May 20, 2011.

Koutsimanis C et al: "A Dynamic Resource Allocation Scheme for Guaranteed Bit Rate Services in OFDMA Networks", IEEE International Conference on Communications, 2008: ICC '08 ; May 19-23, 2008, Beijing, China, IEEE, Piscataway, NJ, USA, May 19, 2008, pp. 2524-2530, XP031265799, ISBN: 978-1-4244-2075-9.

Wu Y. et al., "A novel spectrum arrangement scheme for femto cell deployment in LTE macro cells", IEEE 20th International Symposium on Personal, Indoor and Mobile Radio Communications (PIMRC 2009), IEEE, Piscataway, NJ, USA, Sep. 13, 2009, pp. 6-11, XP031660097, ISBN: 978-1-4244-5122-7.

Alcatel-Lucent Shanghai Bell, "Discussion on CoMP Related RAN2 Issues" 3GPP TSG-RAN WG#68 R2-096940, Nov. 9, 2009.

I2R: "Opportunistic uplink coordinated multi-point reception for LTE-A", 3GPP TSG RAN WG1 Meeting #57, R1-091786, May 2009, pp. 1-3.

Imamura D., et al., "LTE-Advanced Wireless Interface in 3GPP", Proceedings 1 of the 2009 IEICE Communication Society Conference, Sep. 1, 2009.

Liu S., et al., "Coordinated Multiple Point Transmission Technique in LTE-Advanced Systems," Telecommunications Network Technology, pp. 5-9, Sep. 2009.

Samsung, "Design Considerations for CoMP Joint Transmission", R1-093382, 3GPP RAN WG1 #58 meeting, Shenzhen, China, Aug. 24-Aug. 28, 2009, pp. 1-10.

Taiwan Search Report—TW100104189—TIPO—Dec. 18, 2013.

* cited by examiner

RESOURCE ALLOCATION AND TRANSMISSION FOR COORDINATED MULTI-POINT TRANSMISSION

The present application claims priority to U.S. Provisional Patent Application Ser. No. 61/302,038, entitled "Method and Apparatus for Resource Allocation and Transmission in a Wireless Transmission System," filed Feb. 5, 2010, the entirety of which is hereby incorporated by reference.

FIELD OF INVENTION

The present invention relates generally to the field of wireless communications and, more particularly to resource allocation and transmission for coordinated multi-point transmission.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Coordinated multi-point (CoMP) transmission and reception is proposed for 3GPP LTE Advanced (LTE-A). CoMP utilizes multiple, geographically dispersed nodes connected over a backhaul connection to a central processing unit to provide enhanced coverage and performance over conventional single node operation.

Coordinating the transmission from multiple, geographically dispersed antennas can be used to increase the signal-to-noise ratio for users far from the antenna sites, for example by transmitting the same time-frequency resources from multiple sites.

SUMMARY

Disclosed embodiments relate to methods, apparatuses and articles of manufacture for receiving an aggregate downlink resource allocation at a user equipment, where the aggregate downlink resource allocation comprises a plurality of scheduled resources for the user equipment, and receiving, based on the aggregate downlink resource allocation, a transmission from a plurality of cells in a cooperating set of cells, comprising receiving a portion of the transmission from a first cell on fewer than the plurality of scheduled resources.

Other embodiments relate to methods, apparatuses and articles of manufacture for determining, at a serving cell, an aggregate downlink resource allocation for a user equipment, where the aggregate downlink resource allocation comprises a plurality of scheduled resources, and coordinating a transmission to the UE by a plurality of cells in a cooperating set of cells based on the aggregate downlink resource allocation, where at least one cell in the cooperating set transmits on fewer than the plurality of scheduled resources.

Yet other embodiments relate to methods, apparatuses and articles of manufacture for receiving at a cooperating cell notification of an aggregate downlink resource allocation comprising a plurality of scheduled resources, selecting a portion of the scheduled resources for a transmission to a user equipment based on channel state information, capabilities, restrictions, etc. associated with the cooperating cell, and transmitting to the user equipment on the selected portion of the scheduled resources.

Still other embodiments relate to methods, apparatus and articles of manufacture for receiving an aggregate uplink resource grant at a user equipment, where the aggregate uplink resource grant comprises a plurality of resources scheduled for a transmission from the user equipment, and transmitting on the plurality of resources, where at least one cell receives the transmission on a portion of the plurality of resources that is less than the aggregated uplink resource grant.

Other embodiments relate to methods, apparatus and articles of manufacturer for transmitting an aggregate uplink resource grant from a serving cell, where the aggregate uplink resource grant comprises a plurality of resources scheduled for a transmission from a user equipment, and receiving resources in the transmission, where the resources consist of less than the plurality of resources.

Additional embodiments relate to methods, apparatus and articles of manufacture for receiving at a cooperating cell, a notification from a serving cell of an aggregate uplink resource grant to a user equipment, where the aggregate uplink resource grant comprises a plurality of resources scheduled for a transmission, selecting to receive resources that are less than the plurality of resources, based on received channel state information and/or capabilities of the cooperating cell, and receiving the transmission on the selected resources.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Provided embodiments are illustrated by way of example, and not of limitation, in the figures of the accompanying drawings in which.

DETAILED DESCRIPTION

Figure 1:
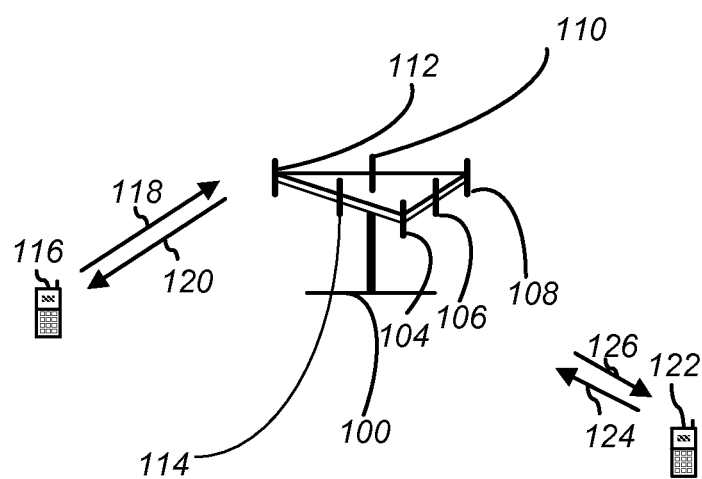
FIG. 1 illustrates a wireless communication system in one embodiment.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present information in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omnidirectionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

3G 3rd Generation
    3GPP 3rd Generation Partnership Project
    ACLR Adjacent channel leakage ratio
    ACPR Adjacent channel power ratio
    ACS Adjacent channel selectivity
    ADS Advanced Design System
    AMC Adaptive modulation and coding
    A-MPR Additional maximum power reduction
    ARQ Automatic repeat request
    BCCH Broadcast control channel
    BTS Base transceiver station
    CDD Cyclic delay diversity
    CCDF Complementary cumulative distribution function
    CDMA Code division multiple access
    CFI Control format indicator
    Co-MIMO Cooperative MIMO
    CP Cyclic prefix
    CPICH Common pilot channel
    CPRI Common public radio interface
    CQI Channel quality indicator
    CRC Cyclic redundancy check
    DCI Downlink control indicator
    DFT Discrete Fourier transform
    DFT-SOFDM Discrete Fourier transform spread OFDM
    DL Downlink (base station to subscriber transmission)
    DL-SCH Downlink shared channel
    DSP Digital signal processing
    DT Development toolset
    DVSA Digital vector signal analysis
    EDA Electronic design automation E-DCH Enhanced dedicated channel
E-UTRAN Evolved UMTS terrestrial radio access network
eMBMS Evolved multimedia broadcast multicast service
eNB Evolved Node B
EPC Evolved packet core
EPRE Energy per resource element
ETSI European Telecommunications Standards Institute
E-UTRA Evolved UTRA
E-UTRAN Evolved UTRAN
EVM Error vector magnitude
FDD Frequency division duplex
FFT Fast Fourier transform
FRC Fixed reference channel
FS1 Frame structure type 1
FS2 Frame structure type 2
GSM Global system for mobile communication
HARQ Hybrid automatic repeat request
HDL Hardware description language
HI HARQ indicator
HSDPA High speed downlink packet access
HSPA High speed packet access
HSUPA High speed uplink packet access
IFFT Inverse FFT
IOT Interoperability test
IP Internet protocol
LO Local oscillator
LTE Long term evolution
MAC Medium access control
MBMS Multimedia broadcast multicast service
MBSFN Multicast/broadcast over single-frequency network
MCH Multicast channel
MIMO Multiple input multiple output
MISO Multiple input single output
MME Mobility management entity
MOP Maximum output power
MPR Maximum power reduction
MU-MIMO Multiple user MIMO
NAS Non-access stratum
OBSAI Open base station architecture interface
OFDM Orthogonal frequency division multiplexing
OFDMA Orthogonal frequency division multiple access
PAPR Peak-to-average power ratio
PAR Peak-to-average ratio
PBCH Physical broadcast channel
P-CCPCH Primary common control physical channel
PCFICH Physical control format indicator channel
PCH Paging channel
PDCCH Physical downlink control channel
PDCP Packet data convergence protocol
PDSCH Physical downlink shared channel
PHICH Physical hybrid ARQ indicator channel
PHY Physical layer
PRACH Physical random access channel
PMCH Physical multicast channel
PMI Pre-coding matrix indicator
P-SCH Primary synchronization signal
PUCCH Physical uplink control channel
PUSCH Physical uplink shared channel.

Figure 2:
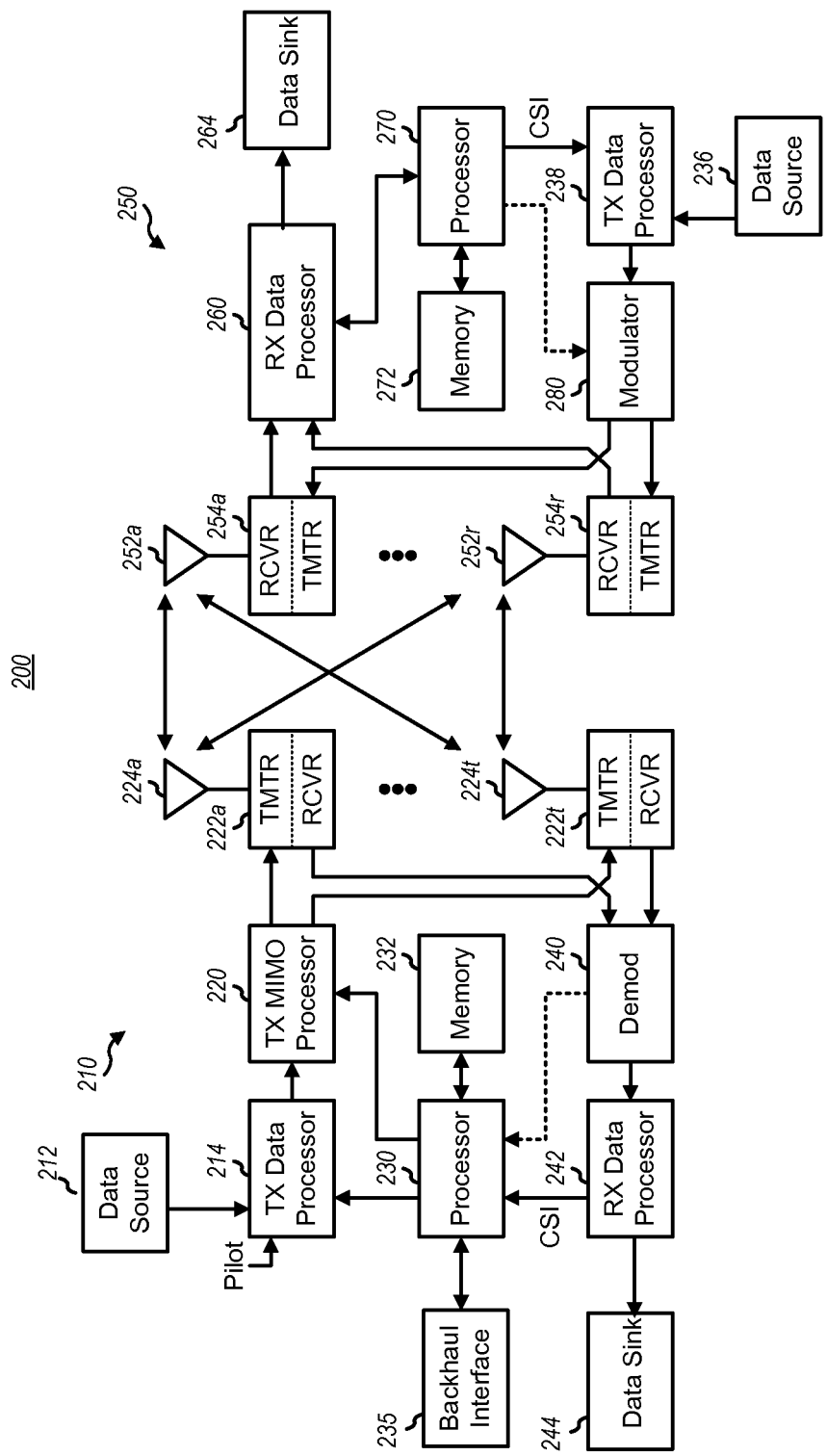
FIG. 2 illustrates a block diagram of a communication system in one embodiment.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator can be set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions. Processor 230 may also make scheduling decisions (e.g. downlink assignments and uplink grants) for receiver system 250 and may send information to or receive information from other transmitter systems 210 via a backhaul interface 235. For instance, as described herein, when acting as a serving cell, the transmitter system 210 may provide scheduling as well as control information and data to a group of cells comprising a CoMP set of the receiver system 250, or may receive such from other cells when operating as a cooperating member of the CoMP set.

Processor 230 can use CSI information to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

In Release 8 (Rel-8) and Release 9 (Rel-9) of LTE, time-frequency resources for a user equipment are scheduled (allocated or assigned) via a physical downlink control channel (PDCCH). The PDCCH is used to schedule downlink resources from the serving cell to the user equipment on a physical downlink shared data channel (PDSCH), and uplink resources from the user equipment to the serving cell on a physical uplink shared data channel (PUSCH). The resource allocations are controlled by different downlink control information (DCI) formats, which are different for the downlink and uplink resource assignments. There are three types of downlink resource assignments in LTE Rel-8 and Rel-9; type 0, type 1 and type 2. Type 0 and type 1 are bitmapped based assignments that address resource block groups (type 0) or individual resource blocks in a subset of resource block groups (resource blocks are the basic time frequency resource elements used in LTE with a duration 6 or 7 orthogonal frequency division multiplex (OFDM) symbols in the time domain and 12 contiguous OFDM subcarriers in the frequency in the frequency domain. Type 2 resource assignments are virtually contiguous assignments requiring the fewest number of assignment bits for a given number of assigned resource blocks.

In the uplink, LTE Rel-8 and Rel-9 uses single-carrier frequency division multiple access and physically contiguous type 2 resource assignments (although the assignments may hop between resource blocks in a transmission subframe, or between two different subframes (where a subframe is two consecutive resource blocks). For LTE Rel-10 (LTE Advanced), clustered uplink assignments have been proposed, where a user equipment may be assigned two or more clusters of resource blocks, where each cluster is physically contiguous but the clusters may not be contiguous.

Figure 3A:
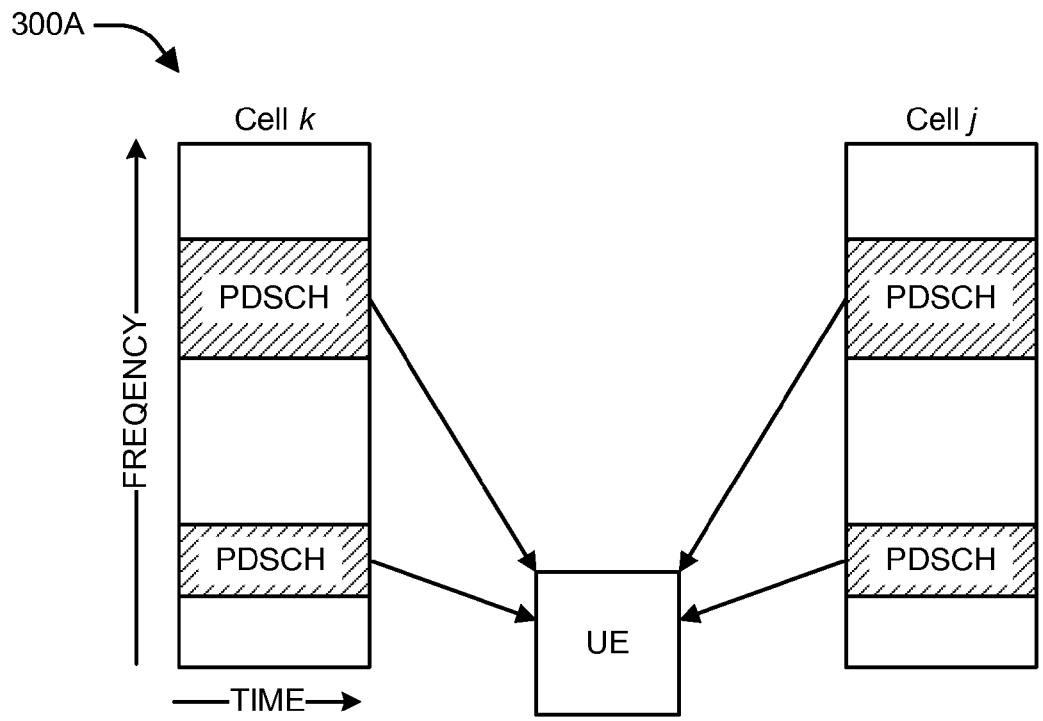
FIG. 3A illustrates a downlink CoMP transmission in one embodiment.
Figure 3B:
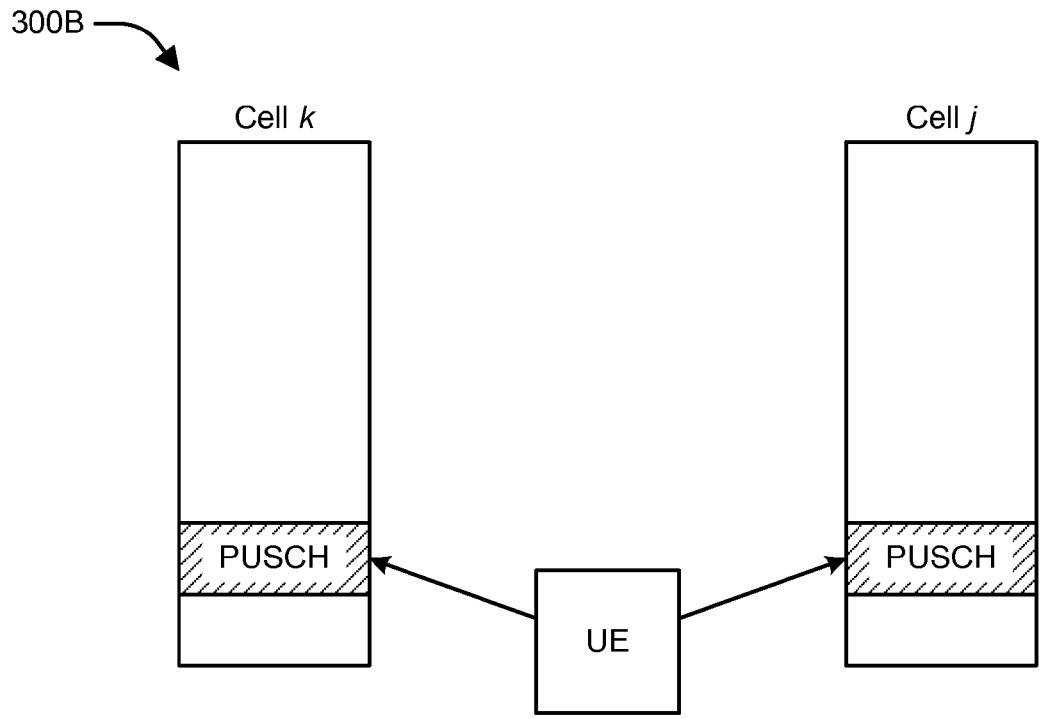
FIG. 3B illustrates an uplink CoMP transmission in one embodiment.

As noted above, coordinated multi-point transmission (CoMP) is also proposed for LTE-A. Typically, cells involved in a CoMP downlink transmission to a user equipment (hereinafter UE) all use the same resources on the downlink (PDSCH). Similarly, for uplink CoMP reception, all involved cells may attempt to receive the same resources on the PUSCH. This situation is illustrated in FIG. 3A for the downlink and FIG. 3B, for the uplink. In FIG. 3A, the UE receives the same PDSCH resources from both participating cells, Cell k and cell j (non-contiguous resource allocation is shown. In FIG. 3B, the UE transmits the same PUSCH resources to both participating cells (where the resource allocations are contiguous.

However, in scenarios such as heterogeneous networks, the cells involved in the transmission for a given UE may have different resource management schemes or constraints. For example, while cell k in FIG. 3A may be able to use noncontiguous allocations 301 and 302 without any restrictions, cell j may have limited capability or different priorities and may need to limit its transmission to the UE to resource allocation 301 only. Such a limitation or restriction may be due to, for example, possible interference cell j would cause to other cells if it attempts to transmit allocation 301 to the UE, If the UE were restricted to receiving the same DL resources from both cell k and cell j, then it would be limited to the reception of the smallest common component, resource allocation 302, resulting in a loss of resource utilization efficiency.

In one aspect of the present disclosure, a resource allocation mode may be configured where, for cells involved in a downlink CoMP transmission to a given UE, the PDSCH resources used by each cell are not necessarily the same. In another aspect, a resource allocation mode may be configured where, for cells involved in an uplink CoMP reception from a given UE, the PUSCH resources transmitted from the UE to each CoMP participating cell are not necessarily the same. The resource allocations may be applicable to all of the resource allocation types discussed above (i.e., types 0, 1 and 2)

In order to clarify the following discussion, the following terms are defined: As used herein, the term serving cell refers to a single cell that provides uplink and downlink assignments to a UE.

As used herein, a transmission point (point) is any entity (including a cell, an access point, an eNodeB, etc.) that is capable of transmission to, or reception from, a UE in a CoMP scenario.

As used herein, the term CoMP cooperating set refers to a set of points capable of transmission/reception with respect to a UE in a CoMP scenario, including the serving cell. This set may or may not be transparent to the UE.

As used herein, the term CoMP transmission point(s) refers to the point or set of points that are transmitting to the UE. The set of CoMP transmission points is a subset of the CoMP cooperating set.

As used herein, the term joint processing refers to the capability of each transmission point in a CoMP cooperating set to send/receive data to/from a UE.

As used herein, the term joint transmission refers to PDSCH transmission from multiple points in the CoMP cooperating set at a given time.

As used herein, the term dynamic cell selection refers to PDSCH transmission from one or more points within the CoMP cooperating set at a particular time. The transmitting cell or cells can change dynamically from subframe to subframe.

As used herein, the term coordinated scheduling/beamforming (CS/CB) refers to data transmission from a serving cell and in connection with which user scheduling and beamforming decisions are made in coordination with cells in the CoMP cooperating set.

As used herein, the term CoMP measurement set refers to a set of cells that can provide channel state information reports to the serving cell regarding their link with the UE. The CoMP cooperating set may be coextensive with the CoMP measurement set or a subset thereof based on a down-selection by the serving cell (or by a backhaul joint transmission processor as described in greater detail below)

In some aspects, resource assignments for a UE in a CoMP scenario may be transmitted on a PDCCH from a single point, the serving cell. Data on a PDSCH may be transmitted from one or more cells (dynamic cell selection) at a given time, which may or may not include the serving cell. Similarly, data on a PUSCH from the UE may be received at a single cell or multiple cells.

Figure 4:
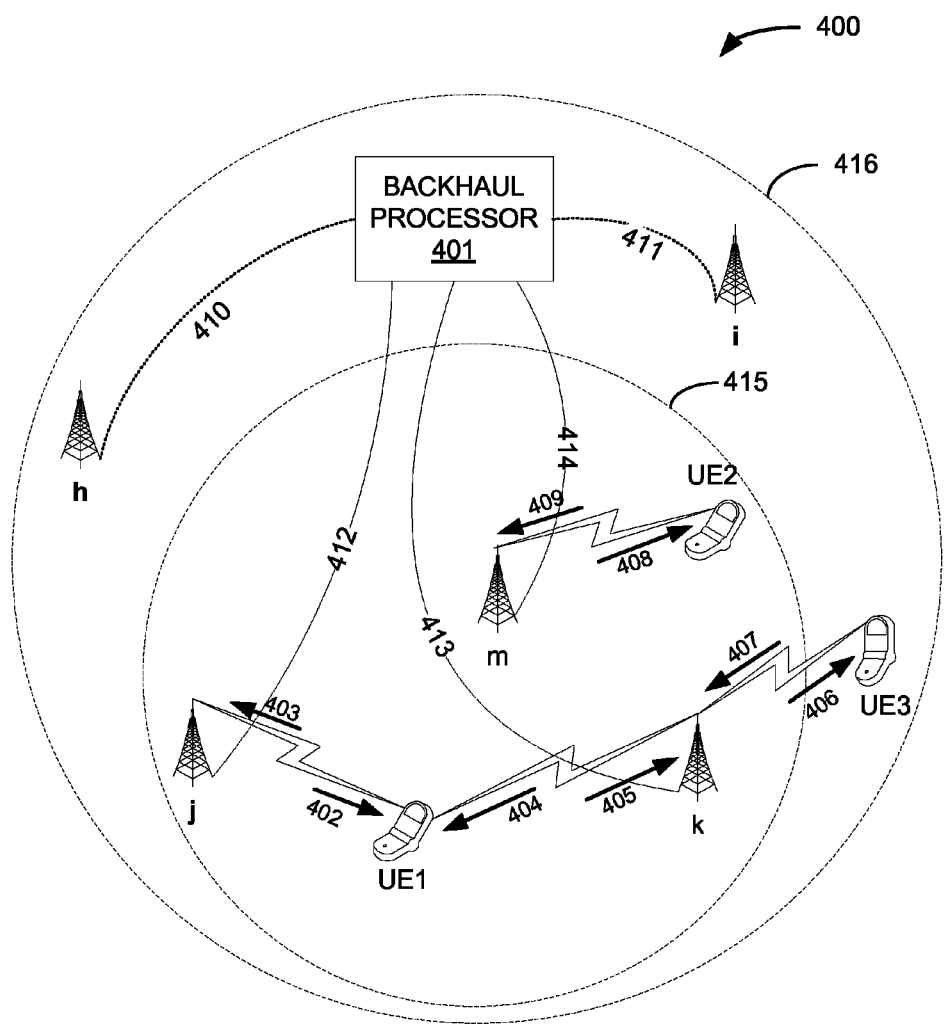
FIG. 4 illustrates a CoMP system in one embodiment.

FIG. 4 illustrates a system 400 in one embodiment, where UE1 is a user equipment involved in a CoMP transmission according to disclosed embodiments. In FIG. 4, a backhaul processor 401 (also known as a joint transmission processor) is linked to cells (points) h, i, j, k and m via links 410, 411, 412, 413 and 414, respectively, and provides backhaul communication tasks therebetween.

For purposes of the following discussion, let point j be the serving cell as defined above. Points j, k and m comprise the cooperating set of cells within boundary 415. Points j and k are transmission points involved in a joint transmission to (from) UE1 or a dynamic cell selection transmission. Point m, a member of the cooperating set of cells (e.g., based on the potential quality of a link to UE1), is not a participant in the joint transmission or dynamic cell selection. For example, point m may have limited capability or need to allocate resources to UE2 that cannot be allocated to UE1 without causing interference to another point, such as point k, or to another UE, such as UE3

Points h and i, in additional to points j, k and m, are assumed to form the measurement set with respect to UE1 within the boundary 416. The measurement set is the set of all points that can receive a channel status indication (CSI) from UE1 and report the CSI to the serving cell, point j (or, alternatively, to backhaul processor 401 as a proxy for point j). As illustrated in FIG. 4, point k may be involved in a CoMP transmission with respect to UE1, and may also be in communication with another UE, such as UE3. It will be appreciated that, while only a limited number of points and UEs are illustrated in FIG. 4 for convenience, disclosed embodiments are not so limited.

Figure 5:
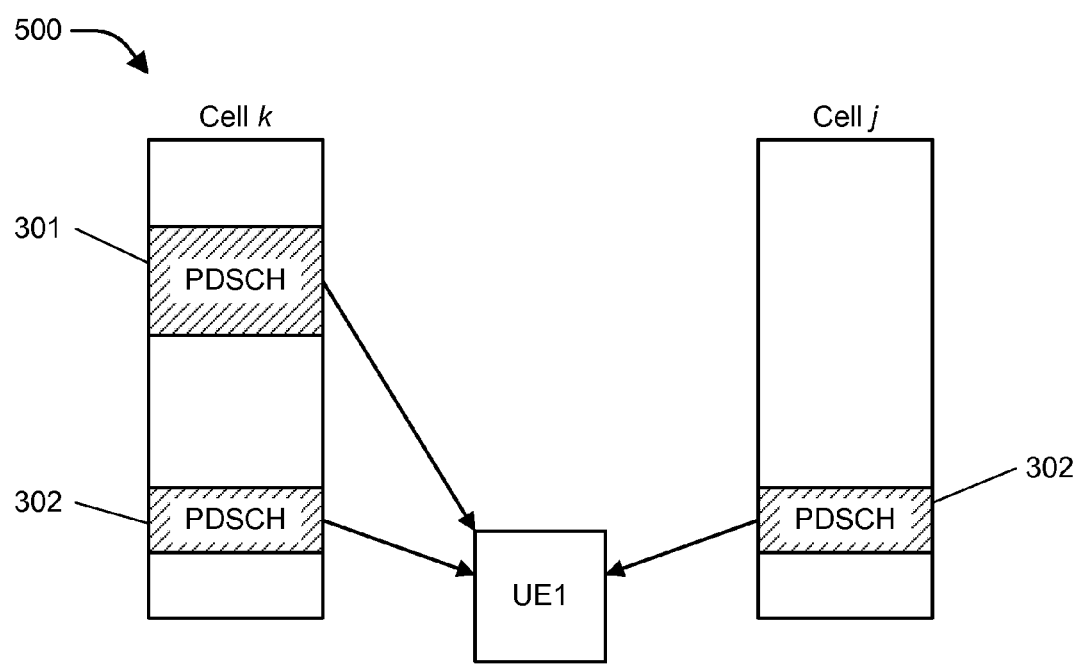
FIG. 5 illustrates a CoMP transmission in one embodiment.

FIG. 5 illustrates one embodiment where cells j and k constitute the subset of the cooperating set of cells involved in a joint transmission to UE1. In FIG. 5, it is assumed that cell j is the serving cell and that cell j transmits resource assignments to UE1 indicating that the PDSCH resources allocated to UE1 are to occupy resources 301 and 302. However, all the resources may not be available from all of the cells involved in the transmission (e.g., cell j may need to allocate resources 301 to another UE or not transmit resources 301 due to potential interference problems).

Note that, while such resource assignments may be transparent to the UE, the information can be made available to the UE as well. This is possible if the resource management schemes are relatively static. For example, if cell j, as the serving cell, semi-statically restricts PDSCH transmissions (e.g., either via power control or complete transmission blanking) in some of its resource sub-bands (e.g., resource sub-band 301), it may inform UE1 of such a restriction, which may improve the quality of PDSCH demodulation. Conventionally, a UE detects cell-specific or UE specific demodulation reference symbols (DM-RS) in order to perform channel estimation for its allocated resources. If the UE is aware that particular resources will not be allocated by a particular cell, then the UE can conserve processing power by not searching for reference symbols that would normally be associated with the resources. For example, if UE1 in FIG. 5 is notified that cell j will not transmit resources to UE1 on resource sub-band 301, then UE1 will not need to demodulate reference symbols from cell j in resource sub-band 301.

For uplink CoMP reception, similar selections can be made with respect to which resources are received and processed by cells in the cooperating set of cells. That is, all of the cells in the cooperating set of cells may not be selected to decode all of the resources transmitted by the UE on the PUSCH. Depending on potential interference reported by the members of the cooperating set of cells, and scheduling restrictions based, for example, on the need to service other UEs, each cell in the cooperating set of cells may attempt to decode only a fraction of the total PUSCH resources allocated to the UE by the serving cell.

While decoding outputs from all or some of the cells in the cooperating set of cells could be used to perform soft decoding of the allocated PUSCH resources, in one embodiment, each cluster transmitted by the UE may include an error detection code (such as a CRC) such that each cell involved in the CoMP reception can determine if it has successfully decoded the PUSCH resource. The UE can be configured to encode each PUSCH resource with a CRC via higher layer signaling (e.g., layer 2 or layer 3).

In one embodiment, the UE may be informed of system bandwidth partitioning restrictions (e.g., via higher layer signaling or hard-coded limits). For each bandwidth partition, the UE may be scheduled with one or more clusters for PUSCH transmission. The UE can add an error detection code, such as a CRC, to each bandwidth partition. Different cells in the cooperating set of cells may participate in the uplink CoMP transmission with different bandwidth restrictions, and decode different clusters corresponding to different CRCs.

In one embodiment, the cooperating cells participating in the CoMP reception may report the results of CRC decode and verification operations to the serving cell via ACK/NACK transmissions to the serving cell through the backhaul processor, and the serving cell bundles the ACK/NACK transmissions from the cooperating cells into a consolidated ACK/NACK (e.g., a single bit) transmitted on an existing physical hybrid ARQ indicator channel (PHICH). The UE may retransmit based on the contents of the PHICH using the same or different cooperating cells used for the original transmission.

Figure 6:
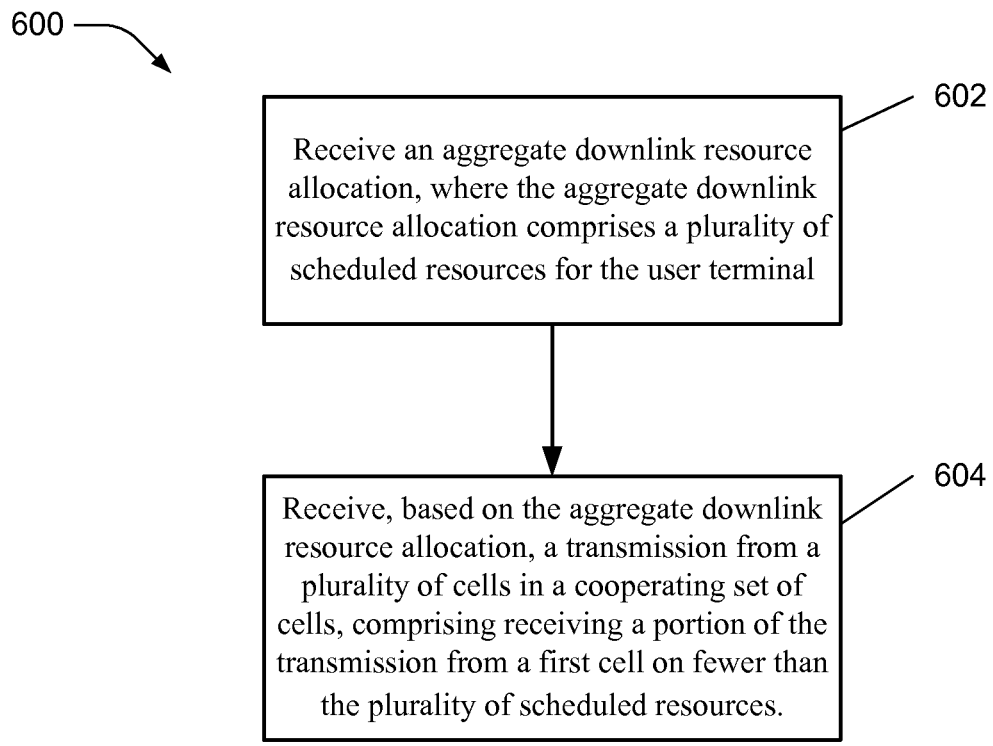
FIG. 6 is a flowchart illustrating a method in one embodiment.

FIG. 6 is a flowchart 600 illustrating a method in a user equipment according to one provided embodiment. For purposes of simplicity of explanation, the method is shown and described as a series of operations. It is to be understood that the method is not limited by the order of operations, as some operations can, in accordance with one or more embodiments, occur in different orders and/or concurrently with other operations from that shown and described herein. For example, those skilled in the art will understand and appreciate that a method could alternatively be represented as a series of interrelated states or events, such as in a state diagram. Moreover, not all illustrated operations may be required to implement a method in accordance with one or more of the disclosed embodiment.

In FIG. 6, the method 600 begins at operation 602, receiving an aggregate downlink resource allocation at a user equipment, where the aggregate downlink resource allocation comprises a plurality of scheduled resources for the user equipment (e.g., sub-bands of PDSCH resources). The method continues at operation 604, receiving, based on the aggregate downlink resource allocation, a transmission from a plurality of cells in a cooperating set of cells, comprising receiving a portion of the transmission from a first cell on fewer than the plurality of scheduled resources.

As previously described, the UE may receive an indication of which cell or cells in the cooperating set will transmit on resources forming part of the aggregate resource allocation, or the selection of transmitting cells may be transparent to the UE.

Figure 7:
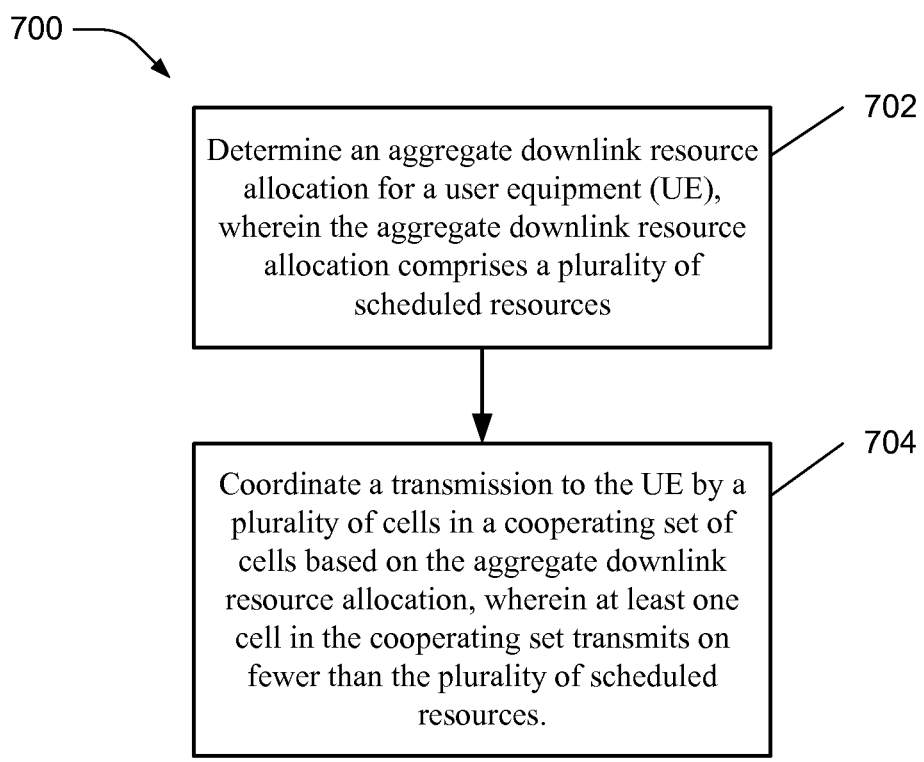
FIG. 7 is a flowchart illustrating a method in one embodiment.

FIG. 7 is a flowchart 700 illustrating a method in a serving cell according to one provided embodiment. In FIG. 7, the method begins at operation 702, determining an aggregate downlink resource allocation for a user equipment (UE), wherein the aggregate downlink resource allocation comprises a plurality of scheduled resources. For example, the aggregate resource allocation may include a plurality of PDSCH resources on which the serving cell has scheduled a data transmission for the UE. The method 700 continues at operation 704, with coordinating a transmission to the UE by a plurality of cells in a cooperating set of cells based on the aggregate downlink resource allocation, wherein at least one cell in the cooperating set transmits on fewer than the plurality of scheduled resources.

Coordinating the transmission may be performed in a centralized fashion in which the serving cell informs each transmission point as to which resources in the aggregate resource allocation should be utilized for data transmission to the UE. Alternatively, coordinating the transmission may be decentralized where each transmission point is notified as to some or all of the aggregate resource allocation and each transmission point transmits to the UE on at least a portion of the allocated resources. In each case, the portion of the aggregate resource allocation on which a cooperating cell transmits may be based on its corresponding capabilities and restrictions.

Figure 8:
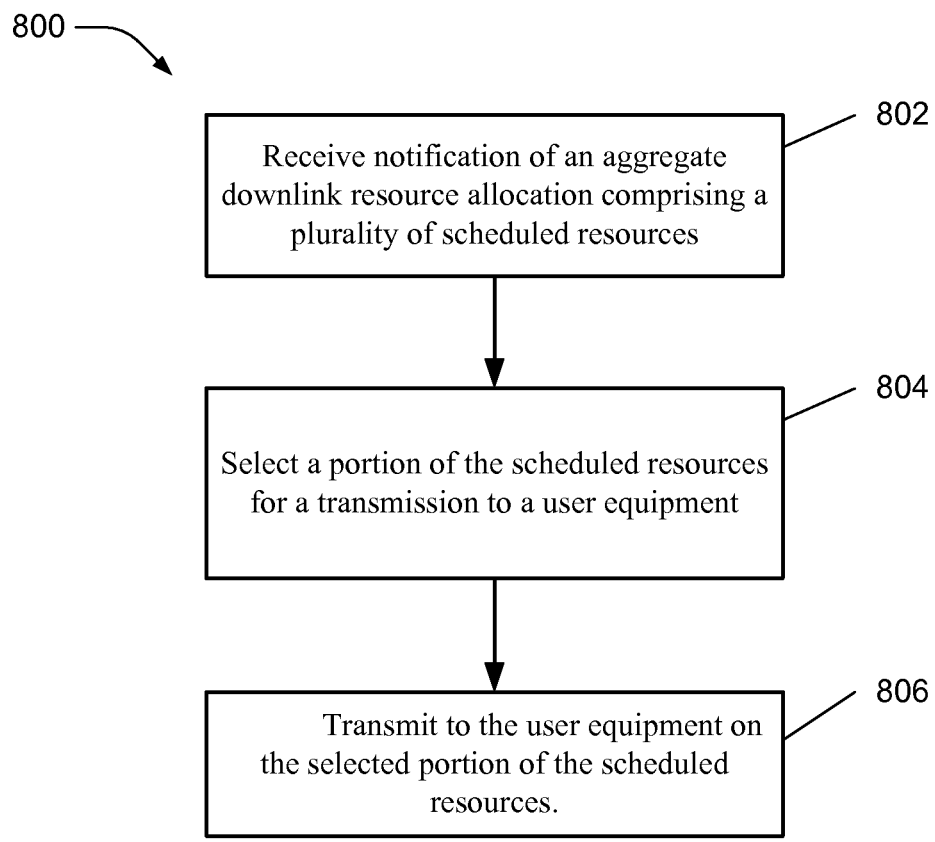
FIG. 8 is a flowchart illustrating a method in one embodiment.

FIG. 8 illustrates a method 800 in a cooperating cell in one embodiment. In FIG. 8, the method 800 begins at operation 802, receiving notification of an aggregate downlink resource allocation comprising a plurality of scheduled resources for transmission to a user equipment from a cooperating set of cells. The method 800 continues at operation 804, selecting a portion of the scheduled resources for a transmission to a user equipment. Selecting the portion of scheduled resources can be based, for example, on channel state information or the particular capabilities and/or restrictions on the operation of the cooperating cell. The method 800 concludes with operation 806, transmitting to the user equipment on the selected portion of the scheduled resources.

Figure 9:
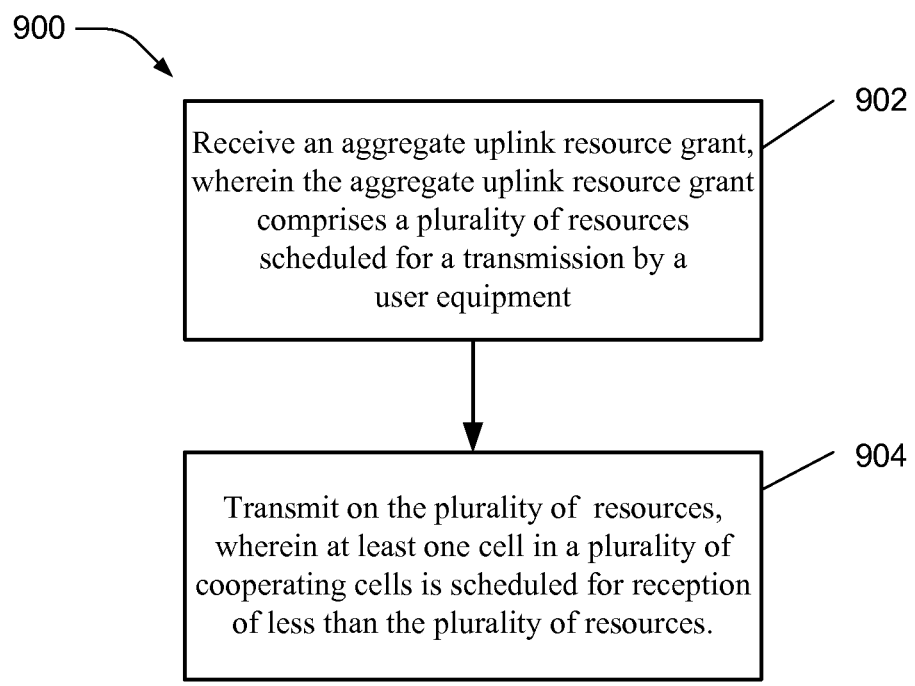
FIG. 9 is a flowchart illustrating a method in one embodiment.

FIG. 9 illustrates a method 900 in a user equipment in one embodiment. In FIG. 9, the method 900 begins at operation 902, receiving an aggregate uplink resource grant, wherein the aggregate uplink resource grant comprises a plurality of resources allocated for use by the user equipment. The aggregate resource grant, for example, may include an uplink grant from the serving cell comprising a plurality of PUSCH resources on which the user equipment may transmit. The method 900 continues at operation 904, transmitting on the plurality of resources, wherein at least one cell in a plurality of cooperating cells is scheduled for reception of less than all of the plurality of resources. The UE may direct portions of the uplink transmission to specific cells in the CoMP set, for example, by using cell-specific information to encode selected portions of the transmission or by associating portions of the transmission with particular cell identifiers. Alternatively, the portions of the UL transmission may be received and decoded by particular cells in the CoMP set in a manner that is transparent to the UE.

Figure 10:
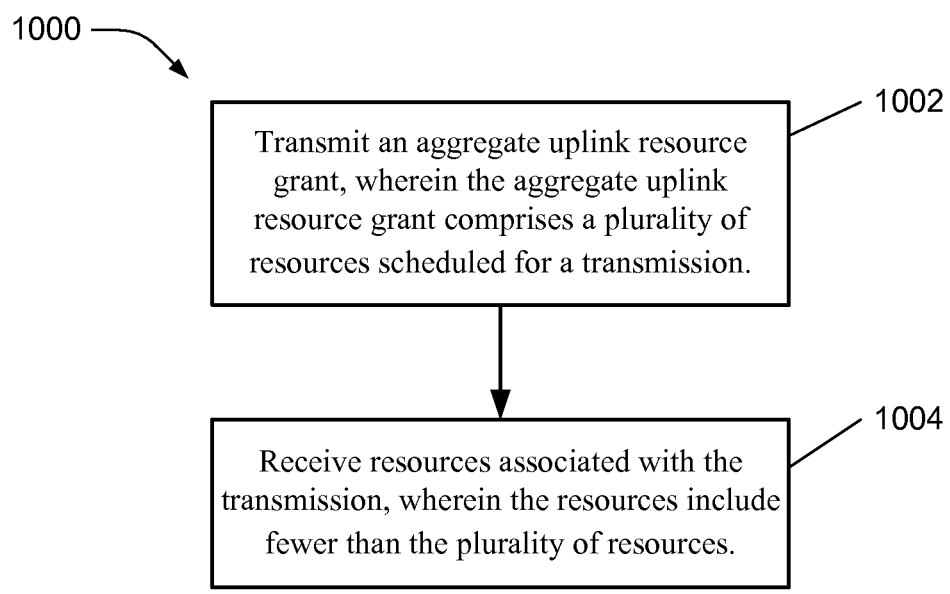
FIG. 10 is a flowchart illustrating a method in one embodiment.

FIG. 10 is a flowchart 1000 illustrating a method in a serving cell. In FIG. 10, the method 1000 begins at operation 1002, transmitting an aggregate uplink resource grant, wherein the aggregate uplink resource grant comprises a plurality of resources allocated for a transmission by the UE. The method continues at operation 1004, receiving resources associated with the transmission, wherein the resources include less than the plurality of resources.

Figure 11:
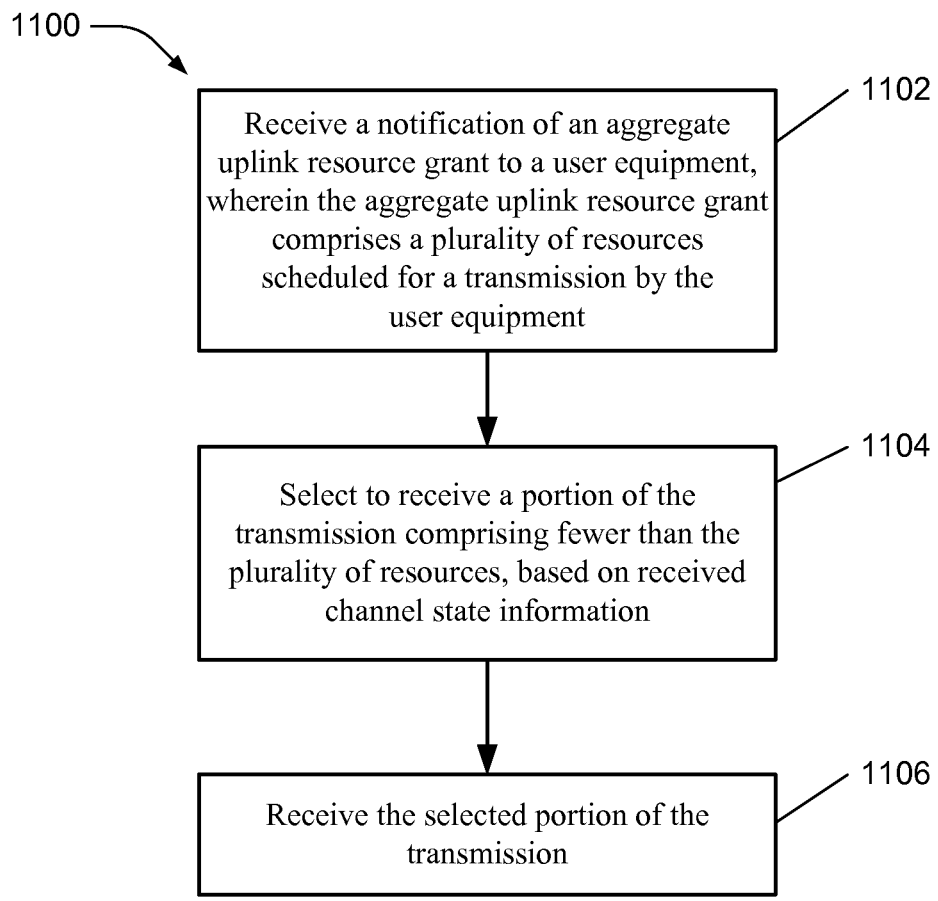
FIG. 11 is a flowchart illustrating a method in one embodiment.

FIG. 11 is a flowchart 1100 illustrating a method in a cooperating cell in one embodiment. In FIG. 11, the method 1100 begins at operation 1102, receiving from a serving cell, a notification of an aggregate uplink resource grant to a user equipment, wherein the aggregate uplink resource grant comprises a plurality of resources scheduled for a transmission by the user equipment. The method continues at operation 1104, selecting to receive a portion of the transmission including fewer than the plurality of resources based, for example, on channel state information relating to the user equipment and information concerning other user equipments associated with the cooperating cell. The method concludes at operation 1106, receiving the selected portion of the transmission from the user equipment.

Figure 12:
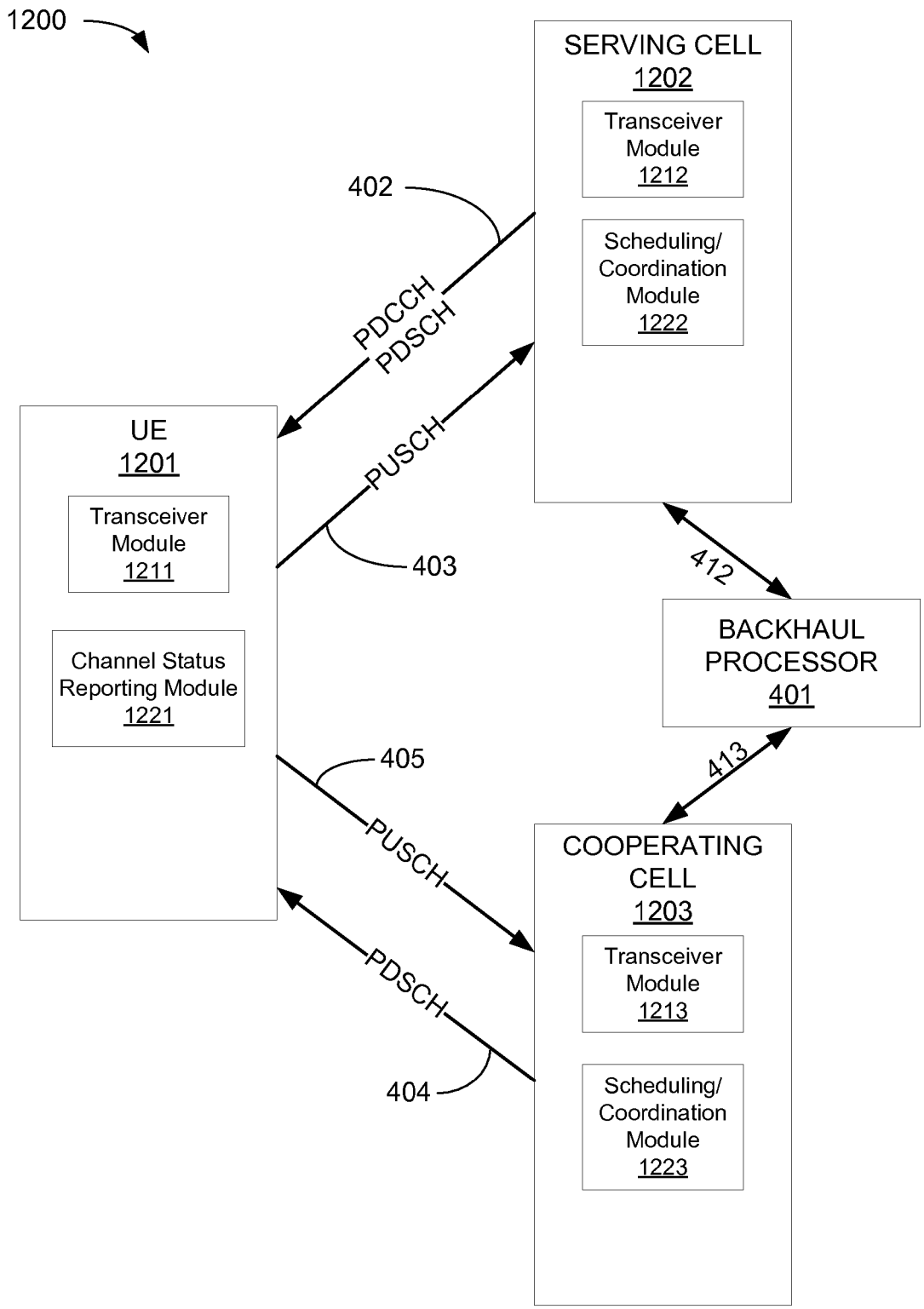
FIG. 12 illustrates a CoMP system in one embodiment.

FIG. 12 illustrates a CoMP communication system 1200 capable of supporting the various operations described herein and, in particular, the methods as described in FIGS. 6-10. System 1200 includes a serving cell 1202 having a transceiver module 1212 that can transmit and/or receive information, signals, data, instructions, commands, bits, symbols and the like. The serving cell 1202 can communicate with a user equipment (UE) 1201 via a downlink that 402 that includes a physical downlink control channel (PDCCH) and a physical downlink shared data channel (PDSCH). The serving cell 1202 can also communicate with the UE 1201 via an uplink 403 that includes a physical uplink shared data channel (PUSCH). The serving cell 1202 can also communicate with backhaul processor 401 via a backhaul link 412. The serving cell 1202 includes a scheduling/coordination module 1222 for scheduling, coordinating and distributing downlink and uplink resources to the UE 1201 in coordination with a cooperating cell 1203 and, in some cases, the backhaul processor 401.

The cooperating cell 1203 includes a transceiver module 1213 that can transmit and/or receive information, signals, data, instructions, commands, bits, symbols and the like. The cooperating cell 1203 can communicate with the UE 1201 via a downlink 404 that includes a physical downlink shared data channel (PDSCH). The cooperating cell 1203 can also communicate with the UE 1201 via an uplink 405 that includes a PUSCH. The cooperating cell 1202 includes a scheduling/coordination module 1222 for receiving and processing aggregate resource allocation information from the serving cell 1202 and selecting resources for transmission to the UE 1201 on the downlink 404 and transmission from the UE 1202 on the uplink 405. The cooperating cell 1203 can also communicate with the backhaul processor 401 via a backhaul link 413 to support the scheduling, coordination and distribution of resources between the serving cell 1202 and the cooperating cell 1203.

The UE 1201 includes a transceiver module 1211 for communication with the serving cell 1202 and the cooperating cell 1203 as described above. Additionally, the UE 1202 includes a channel status information (CSI) reporting module 1221 that reports CSI to the cooperating cell 1202 and the serving cell 1202 that can be used to determine the distribution of aggregate resources, allocated to the UE 1201, between the cooperating cell 1203 and the serving cell 1202. Moreover, although not shown, it is contemplated that any number of serving cells similar to serving cell 1202, any number of UEs similar to UE 1201 and any number of cooperating cells similar to cooperating cell 1203 can be included in system 1200.

Figure 13:
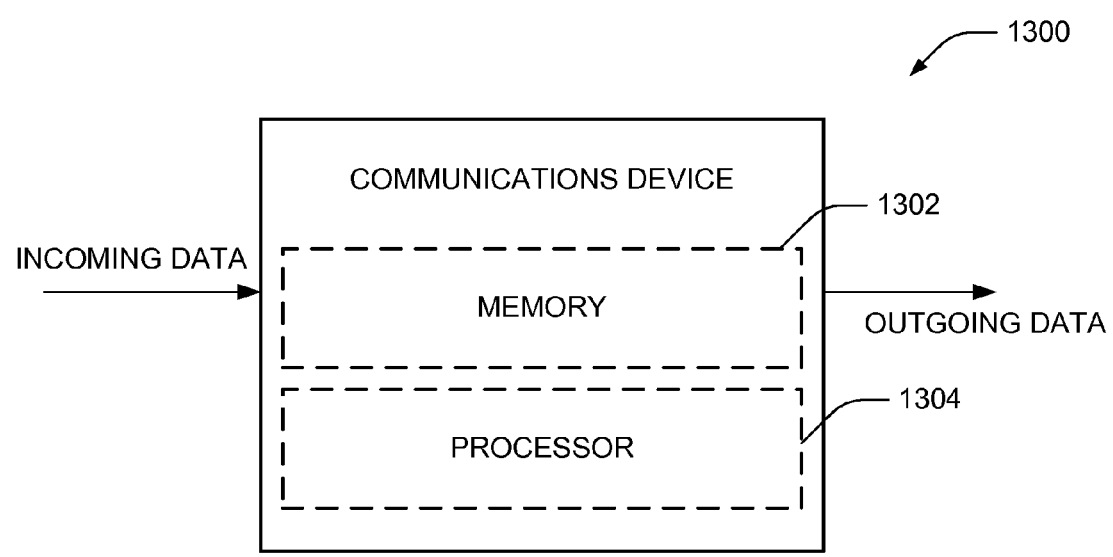
FIG. 13 illustrates an apparatus in one embodiment.

FIG. 13 illustrates an apparatus 1300 within which the various disclosed embodiments may be implemented. The apparatus 1300 shown in FIG. 13 may comprise at least a portion of a serving cell or cooperating cell, or at least a portion of a user equipment (such as the serving cell j, cooperating cell k and user equipment UE1 that are depicted in FIG. 4) and/or at least a portion of a transmitter system or a receiver system (such as the transmitter system 210 and the receiver system 250 that are depicted in FIG. 2). The apparatus 1300 that is depicted in FIG. 13 can be resident within a wireless network and receive incoming data via, for example, one or more receivers and/or the appropriate reception and decoding circuitry (e.g., antennas, transceivers, demodulators and the like). The apparatus 1300 that is depicted in FIG. 13 can also transmit outgoing data via, for example, one or more transmitters and/or the appropriate encoding and transmission circuitry (e.g., antennas, transceivers, modulators and the like). Additionally, or alternatively, the apparatus 1300 that is depicted in FIG. 13 may be resident within a wired network.

FIG. 13 further illustrates that the apparatus 1300 can include a memory 1302 that can retain instructions for performing one or more operations, such as signal conditioning, analysis and the like. Additionally, the apparatus 1300 of FIG. 13 may include a processor 1304 that can execute instructions that are stored in the memory 1302 and/or instructions that are received from another device. The instructions can relate to, for example, configuring or operating the apparatus 1300 or a related communications apparatus. It should be noted that while the memory 1302 that is depicted in FIG. 13 is shown as a single block, it may comprise two or more separate memories that constitute separate physical and/or logical units. In addition, the memory while being communicatively connected to the processor 1304, may reside fully or partially outside of the apparatus 1300 that is depicted in FIG. 13. It is also to be understood that one or more components, such as the serving cell j, the cooperating cell k and the user equipment UE1 depicted in FIG. 4 can exist within a memory such as memory 1302.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 1300 of FIG. 13 can be employed as a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 1201 FIG. 12). In the alternative, the processor and the storage medium may reside as discrete components in a user equipment (e.g., 1201 FIG. 12). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method in a user equipment, comprising:
receiving an aggregate downlink resource allocation, wherein the aggregate downlink resource allocation comprises first and second scheduled resources for the user equipment, and wherein each of the first and second scheduled resources comprises a plurality of frequency resources for a specified transmission interval, the second scheduled resources comprising different frequency resources than the first scheduled resources; and
receiving, based on the aggregate downlink resource allocation, a transmission from a plurality of cells in a cooperating set of cells in the specified transmission interval, comprising receiving a first portion of the transmission in a joint transmission from a first cell and a second cell in the cooperating set on the first scheduled resources and receiving a second portion of the transmission from only one of the first cell or the second cell on the second scheduled resources.

2. The method of claim 1, further comprising receiving a notification that the only one of the first or second cells transmits on the second scheduled resources of the aggregate downlink resource allocation.

3. The method of claim 2, wherein the UE decodes downlink resources based on the notification.

4. The method of claim 1, wherein at least part of the transmission comprises a dynamic cell selection.

5. The method of claim 1, wherein at least part of the transmission comprises coordinated scheduling or coordinated beam-forming during the specified transmission interval, the method further comprising transmitting channel status information to a serving cell in the plurality of cells.

6. The method of claim 1, wherein the cooperating set of cells comprises a subset of a coordinated multi-point measurement set, the coordinated multi-point measurement set comprising a set of cells with respect to which the UE reports channel state information to a serving cell.

7. The method of claim 6, wherein the transmission comprises transmission from a subset of the cooperating set of cells.

8. The method of claim 1, wherein the first and second scheduled resources of the aggregate downlink resource allocation comprise non-contiguous resource clusters.

9. A method in a serving cell, comprising:
determining an aggregate downlink resource allocation for a user equipment (UE), wherein the aggregate downlink resource allocation comprises first and second scheduled resources, and wherein each of the first and second scheduled resources comprises a plurality of frequency resources for a specified transmission interval, the second scheduled resources comprising different frequency resources than the first scheduled resources;
coordinating a transmission to the UE by a plurality of cells in a cooperating set of cells based on the aggregate downlink resource allocation in the specified transmission interval, wherein a first cell and a second cell in the cooperating set transmit a first portion of the transmission in a joint transmission on the first scheduled resources and only one of the first cell or the second cell transmits a second portion of the transmission on the second scheduled resources.

10. The method of claim 9, wherein the first cell in the cooperating set transmits based on a resource allocation transmitted by the serving cell.

11. The method of claim 9, further comprising sending a notification to the UE that the only one of the first or second cells transmits on the second scheduled resources.

12. The method of claim 9, wherein at least part of the transmission comprises a dynamic cell selection.

13. The method of claim 9, wherein at least part of the transmission comprises coordinated scheduling or coordinated beam-forming, the method comprising:
receiving a plurality of channel state information reports at the serving cell; and
transmitting for the at least part of the transmission from one of the first or second cells based on the channel state information reports during the specified transmission interval.

14. The method of claim 9, further comprising:
selecting the plurality of cells in the cooperating set as a subset of a coordinated multi-point measurement set at the serving cell, the coordinated multi-point measurement set comprising a set of cells for which the UE reports channel state information to the serving cell.

15. The method of claim 9, wherein the serving cell selects a transmission set comprising a subset of the cooperating set of cells.

16. The method of claim 9, wherein the first and second scheduled resources of the aggregate downlink resource allocation comprise non-contiguous resource clusters.

17. A method in a cooperating cell, comprising:
receiving notification of an aggregate downlink resource allocation for a user equipment comprising first and second scheduled resources, wherein each of the first and second scheduled resources comprises a plurality of frequency resources for a specified transmission interval, the second scheduled resources comprising different frequency resources than the first scheduled resources; and
performing a coordinated transmission to the user equipment in cooperation with at least one other cell in a set of cooperating cells, wherein the cooperating cell and the at least one other cell transmit a first portion of the transmission in a joint transmission on the first scheduled resources and only one of the cooperating cell or the at least one other cell transmits a second portion of the transmission on the second scheduled resources.

18. The method of claim 17, wherein at least part of the transmission comprises a dynamic cell selection.

19. The method of claim 17, wherein at least part of the transmission comprises coordinated scheduling or coordinated beam-forming during the specified transmission interval.

20. The method of claim 17, wherein the set of cooperating cells comprises a subset of a coordinated multi-point measurement set comprising a set of cells for which channel state information is reported to a serving cell with respect to the user equipment.

21. The method of claim 20, wherein the cooperating cell is a member of a transmission set comprising a subset of the set of cooperating cells.

22. The method of claim 17, wherein the first and second scheduled resources of the aggregate downlink resource allocation comprise non-contiguous resource clusters.

23. A method in a user equipment, comprising:
receiving an aggregate uplink resource grant, wherein the aggregate uplink resource grant comprises first and second resources scheduled for a transmission from the user equipment, and wherein each of the first and second scheduled resources comprises a plurality of frequency resources for a specified transmission interval, the second scheduled resources comprising different frequency resources than the first scheduled resources; and
transmitting first modulated signals on the first scheduled resources and second modulated signals on the second scheduled resources during the specified transmission interval in a single modulation symbol stream, wherein a first cell and a second cell in a set of cooperating cells are scheduled for reception of the first modulated signals in a joint transmission and only one of the first cell or the second cell is scheduled for reception of the second modulated signals.

24. The method of claim 23, wherein at least part of the transmission comprises a dynamic cell selection.

25. The method of claim 23, wherein at least part of the transmission comprises coordinated scheduling or coordinated beam-forming, wherein the user equipment transmits channel status information relating to at least one of the first or second cells in the set of cooperating cells.

26. The method of claim 23, wherein the user equipment transmits channel state information for the set of cooperating cells, wherein the set of cooperating cells comprises a subset of a coordinated multi-point measurement set maintained by the UE.

27. The method of claim 26, wherein the transmission comprises transmission to a subset of the set of cooperating cells.

28. The method of claim 23, further comprising encoding resource clusters of the first and second scheduled resources with cell-specific codes.

29. The method of claim 23, wherein the set of cooperating cells is known to the user equipment.

30. The method of claim 23, wherein the set of cooperating cells is unknown to the user equipment.

31. The method of claim 23, wherein the first and second scheduled resources of the aggregate uplink resource grant comprise non-contiguous resource clusters.

32. A method in a serving cell, comprising:
transmitting an aggregate uplink resource grant to a user equipment (UE), wherein the aggregate uplink resource grant comprises first and second resources scheduled for a transmission by the UE, and wherein each of the first and second scheduled resources comprises a plurality of frequency resources for a specified transmission interval, the second scheduled resources comprising different frequency resources than the first scheduled resources; and
performing coordinated reception of the transmission at the serving cell with at least one other cell in a cooperating set of cells, wherein the transmission comprises first modulated signals transmitted on the first scheduled resources and second modulated signals transmitted on the second scheduled resources during the specified transmission interval in a single modulation symbol stream, and wherein the serving cell and the at least one other cell are scheduled for reception of the first modulated signals and only one of the serving cell or the at least one other cell is scheduled for reception of the second modulated signals.

33. The method of claim 32, wherein at least part of the transmission comprises a dynamic cell selection.

34. The method of claim 32, wherein at least part of the transmission comprises coordinated scheduling or coordinated beam-forming during the specified transmission interval.

35. The method of claim 32, wherein the serving cell receives channel status information reports for the cooperating set of cells, wherein the cooperating set of cells comprises a subset of a coordinated multi-point measurement set of cells.

36. The method of claim 32, further comprising:
signaling the user equipment to encode resource clusters of the first and second scheduled resources with independent error-detection codes;
receiving ACK/NACK indicators from one or more of the cooperating set of cells; and
transmitting a bundled ACK/NACK indicator to the user equipment based on the ACK/NACK indicators.

37. The method of claim 32, wherein the first and second scheduled resources of the aggregate uplink resource grant comprise non-contiguous resource clusters.

38. A method in a cooperating cell, comprising:
receiving a notification of an aggregate uplink resource grant to a user equipment, wherein the aggregate uplink resource grant comprises first and second resources scheduled for a transmission by the user equipment, and wherein each of the first and second scheduled resources comprises a plurality of frequency resources for a specified transmission interval, the second scheduled resources comprising different frequency resources than the first scheduled resources; and
performing coordinated reception of the transmission at the cooperating cell with at least one other cell in a cooperating set of cells, wherein the transmission comprises first modulated signals transmitted on the first scheduled resources and second modulated signals transmitted on the second scheduled resources during the specified transmission interval in a single modulation symbol stream, and wherein the cooperating cell and the at least one other cell are scheduled for reception of the first modulated signals and only one of the cooperating cell or the at least one other cell is scheduled for reception of the second modulated signals.

39. The method of claim 38, wherein at least part of the transmission comprises a dynamic cell selection.

40. The method of claim 38, wherein at least part of the transmission comprises coordinated scheduling or coordinated beam-forming, wherein the cooperating cell reports channel status information to a serving cell.

41. The method of claim 38, wherein the cooperating cell belongs to a coordinated multi-point measurement set of cells, the method further comprising receiving channel status information relating to the user equipment.

42. The method of claim 38, further comprising:
decoding independent error correction codes from resource clusters of at least one of the first or the second scheduled resources;
verifying the error-correction codes; and
sending a decode status to a serving cell.

43. The method of claim 38, wherein the first and second scheduled resources of the aggregate uplink resource grant comprise non-contiguous resource clusters.

44. A user equipment (UE), comprising:
a processor; and
a memory comprising processor executable instructions that, when executed by the processor, configures the user equipment to:
receive an aggregate downlink resource allocation, wherein the aggregate downlink resource allocation comprises first and second scheduled resources for the UE, and wherein each of the first and second scheduled resources comprises a plurality of frequency resources for a specified transmission interval, the second scheduled resources comprising different frequency resources than the first scheduled resources; and
receive, based on the aggregate downlink resource allocation, a transmission from a plurality of cells in a cooperating set of cells in the specified transmission interval, wherein a first portion of the transmission is received in a joint transmission from a first cell and a second cell in the cooperating set on the first scheduled resources and a second portion of the transmission is received from only one of the first cell or the second cell on the second scheduled resources.

45. A serving cell, comprising:
a processor; and
a memory comprising processor executable instructions that, when executed by the processor, configures the serving cell to:
determine an aggregate downlink resource allocation for a user equipment (UE), wherein the aggregate downlink resource allocation comprises first and second scheduled resources for the UE, and wherein each of the first and second scheduled resources comprises a plurality of frequency resources for a specified transmission interval, the second scheduled resources comprising different frequency resources than the first scheduled resources; and
coordinate a transmission to the UE by a plurality of cells in a cooperating set of cells based on the aggregate downlink resource allocation in the specified transmission interval, wherein a first cell and a second cell in the cooperating set transmit a first portion of the transmission in a joint transmission on the first scheduled resources and only one of the first cell or the second cell transmits a second portion of the transmission on the second scheduled resources.

46. A cooperating cell, comprising:
a processor; and
a memory comprising processor executable instructions that, when executed by the processor, configures the cooperating cell to:
receive notification of an aggregate downlink resource allocation for a user equipment comprising first and second scheduled resources, wherein each of the first and second scheduled resources comprises a plurality of frequency resources for a specified transmission interval, the second scheduled resources comprising different frequency resources than the first scheduled resources; and
perform a coordinated transmission to the user equipment in cooperation with at least one other cell in a set of cooperating cells, wherein the cooperating cell and the at least one other cell transmit a first portion of the transmission in a joint transmission on the first scheduled resources and only one of the cooperating cell or the at least one other cell transmits a second portion of the transmission on the second scheduled resources.

47. A user equipment, comprising:
a processor; and
a memory comprising processor executable instructions that, when executed by the processor, configures the user equipment to:
receive an aggregate uplink resource grant, wherein the aggregate uplink resource grant comprises first and second resources scheduled for a transmission from the user equipment, and wherein each of the first and second scheduled resources comprises a plurality of frequency resources for a specified transmission interval, the second scheduled resources comprising different frequency resources than the first scheduled resources; and
transmit first modulated signals on the first scheduled resources and second modulated signals on the second scheduled resources during the specified transmission interval in a single modulation symbol stream, wherein a first cell and a second cell in a set of cooperating cells are scheduled for reception of the first modulated signals in a joint transmission and only one of the first cell or the second cell is scheduled for reception of the second modulated signals.

48. A serving cell, comprising:
a processor; and
a memory comprising processor executable instructions that, when executed by the processor, configures the serving cell to:
transmit an aggregate uplink resource grant to a user equipment, wherein the aggregate uplink resource grant comprises first and second resources scheduled for a transmission by the user equipment, wherein each of the first and second scheduled resources comprises a plurality of frequency resources for a specified transmission interval, the second scheduled resources comprising different frequency resources than the first scheduled resources; and
perform coordinated reception of the transmission at the serving cell with at least one other cell in a cooperating set of cells, wherein the transmission comprises first modulated signals transmitted on the first scheduled resources and second modulated signals transmitted on the second scheduled resources during the specified transmission interval in a single modulation symbol stream, and wherein the serving cell and the at least one other cell are scheduled for reception of the first modulated signals and only one of the serving cell or the at least one other cell is scheduled for reception of the second modulated signals.

49. A cooperating cell, comprising:
a processor; and
a memory comprising processor executable instructions that, when executed by the processor, configures the cooperating cell to:
receive a notification of an aggregate uplink resource grant to a user equipment, wherein the aggregate uplink resource grant comprises first and second resources scheduled for a transmission by the user equipment, wherein each of the first and second scheduled resources comprises a plurality of frequency resources during a specified transmission interval, the second scheduled resources comprising different frequency resources than the first scheduled resources; and perform coordinated reception of the transmission at the cooperating cell with at least one other cell in a cooperating set of cells, wherein the transmission comprises first modulated signals transmitted on the first scheduled resources and second modulated signals transmitted on the second scheduled resources during the specified transmission interval in a single modulation symbol stream, and wherein the serving cell and the at least one other cell are scheduled for reception of the first modulated signals and only one of the cooperating cell or the at least one other cell is scheduled for reception of the second modulated signals.

50. An article of manufacture, comprising a non-transitory machine-readable medium having instructions therein that, when executed by a machine, configures the machine as a user equipment to:

receive an aggregate downlink resource allocation, wherein the aggregate downlink resource allocation comprises first and second scheduled resources for the user equipment, and wherein each of the first and second scheduled resources comprises a plurality of frequency resources for a specified transmission interval, the second scheduled resources comprising different frequency resources than the first scheduled resources; and receive, based on the aggregate downlink resource allocation, a transmission from a plurality of cells in a cooperating set of cells in the specified transmission interval, wherein a first portion of the transmission is received in a joint transmission from a first cell and a second cell in the cooperating set on the first scheduled resources, and wherein a second portion of the transmission is received from only one of the first cell or the second cell on the second scheduled resources.

51. An article of manufacture, comprising a non-transitory machine-readable medium having instructions therein that, when executed by a machine, configure the machine as a serving cell to:

determine an aggregate downlink resource allocation for a user equipment (UE), wherein the aggregate downlink resource allocation comprises first and second scheduled resources, and wherein each of the first and second scheduled resources comprises a plurality of frequency resources for a specified transmission interval, the second scheduled resources comprising different frequency resources than the first scheduled resources;

coordinate a transmission to the UE by a plurality of cells in a cooperating set of cells based on the aggregate downlink resource allocation in the specified transmission interval, wherein a first cell and a second cell in the cooperating set transmit a first portion of the transmission in a joint transmission on the first scheduled resources and only one of the first cell or the second cell transmits a second portion of the transmission on the second scheduled resources.

52. An article of manufacture, comprising a non-transitory machine-readable medium having instructions therein that, when executed by a machine, configure the machine as a cooperating cell to:

receive notification of an aggregate downlink resource allocation for a user equipment comprising first and second scheduled resources, wherein each of the first and second scheduled resources comprises a plurality of frequency resources for a specified transmission interval, the second scheduled resources comprising different frequency resources than the first scheduled resources; and perform a coordinated transmission to the user equipment in cooperation with at least one other cell in a set of cooperating cells, wherein the cooperating cell and the at least one other cell transmit a first portion of the transmission in a joint transmission on the first scheduled resources and only one of the cooperating cell or the at least one other cell transmits a second portion of the transmission on the second scheduled resources.

53. An article of manufacture, comprising a non-transitory machine-readable medium having instructions therein that, when executed by a machine, configure the machine as a user equipment to:

receive an aggregate uplink resource grant, wherein the aggregate uplink resource grant comprises first and second resources scheduled for a transmission from the user equipment, and wherein each of the first and second scheduled resources comprises a plurality of frequency resources for a specified transmission interval, the second scheduled resources comprising different frequency resources than the first scheduled resources; and transmit first modulated signals on the first scheduled resources and second modulated signals on the second scheduled resources during the specified transmission interval in a single modulation symbol stream, wherein a first cell and a second cell in a set of cooperating cells are scheduled for reception of the first modulated signals in a joint transmission and only one of the first or the second cell is scheduled for reception of the second modulated signals.

54. An article of manufacture, comprising a non-transitory machine-readable medium having instructions therein that, when executed by a machine, configure the machine as a serving cell to:

transmit an aggregate uplink resource grant, wherein the aggregate uplink resource grant comprises first and second resources scheduled for a transmission by a user equipment, and wherein each of the first and second scheduled resources comprises a plurality of frequency resources for a specified transmission interval, the second scheduled resources comprising different frequency resources than the first scheduled resources; and perform coordinated reception of the transmission at the serving cell with at least one other cell in a cooperating set of cells, wherein the transmission comprises first modulated signals transmitted on the first scheduled resources and second modulated signals transmitted on the second scheduled resources during the specified transmission interval in a single modulation symbol stream, and wherein the serving cell and the at least one other cell are scheduled for reception of the first modulated signals and only one of the serving cell or the at least one other cell is scheduled for reception of the second modulated signals.

55. An article of manufacture, comprising a non-transitory machine-readable medium having instructions therein that, when executed by a machine, configure the machine as a cooperating cell to:

receive a notification of an aggregate uplink resource grant to a user equipment, wherein the aggregate uplink resource grant comprises first and second resources scheduled for a transmission by the user equipment, and wherein each of the first and second scheduled resources comprises a plurality of frequency resources for a specified transmission interval, the second scheduled resources comprising different frequency resources than the first scheduled resources; and perform coordinated reception of the transmission at the cooperating cell with at least one other cell in a cooperating set of cells, wherein the transmission comprises first modulated signals transmitted on the first scheduled resources and second modulated signals transmitted on the second scheduled resources during the specified transmission interval in a single modulation symbol stream, and wherein the cooperating cell and the at least one other cell are scheduled for reception of the first modulated signals and only one of the cooperating cell or the at least one other cell is scheduled for reception of the second modulated signals.

56. A user equipment, comprising:
means for receiving an aggregate downlink resource allocation, wherein the aggregate downlink resource allocation comprises first and second scheduled resources for the user equipment, and wherein each of the first and second scheduled resources comprises a plurality of frequency resources for a specified transmission interval, the second scheduled resources comprising different frequency resources than the first scheduled resources; and
means for receiving, based on the aggregate downlink resource allocation, a transmission from a plurality of cells in a cooperating set of cells in the specified transmission interval, wherein a first portion of the transmission is received in a joint transmission from a first cell and a second cell in the cooperating set on the first scheduled resources and a second portion of the transmission from only one of the first cell or the second cell on the second scheduled resources.

57. A serving cell, comprising:
means for determining an aggregate downlink resource allocation for a user equipment (UE), wherein the aggregate downlink resource allocation comprises first and second scheduled resources, and wherein each of the first and second scheduled resources comprises a plurality of frequency resources for a specified transmission interval, the second scheduled resources comprising different frequency resources than the first scheduled resources; and
means for coordinating a transmission to the UE by a plurality of cells in a cooperating set of cells based on the aggregate downlink resource allocation in the specified transmission interval, wherein a first cell and a second cell in the cooperating set transmit a first portion of the transmission in a joint transmission on the first scheduled resources and only one of the first cell or the second cell transmits a second portion of the transmission on the second scheduled resources.

58. A cooperating cell, comprising:
means for receiving notification of an aggregate downlink resource allocation comprising first and second scheduled resources, wherein each of the first and second scheduled resources comprises a plurality of frequency resources for a specified transmission interval, the second scheduled resources comprising different frequency resources than the first scheduled resources; and
means for performing a coordinated transmission to the user equipment in cooperation with at least one other cell in a set of cooperating cells, wherein the cooperating cell and the at least one other cell transmit a first portion of the transmission in a joint transmission on the first scheduled resources and only one of the cooperating cell or the at least one other cell transmits a second portion of the transmission on the second scheduled resources.

59. A user equipment, comprising:
means for receiving an aggregate uplink resource grant, wherein the aggregate uplink resource grant comprises first and second resources scheduled for a transmission from the user equipment, and wherein each of the first and second scheduled resources comprises a plurality of frequency resources for a specified transmission interval, the second scheduled resources comprising different frequency resources than the first scheduled resources; and
means for transmitting first modulated signals on the first scheduled resources and second modulated signals on the second scheduled resources during the specified transmission interval in a single modulation symbol stream, wherein a first cell and a second cell in a set of cooperating cells are scheduled for reception of the first modulated signals in a joint transmission and only one of the first cell or the second cell is scheduled for reception of the second modulated signals.

60. A serving cell, comprising:
means for transmitting an aggregate uplink resource grant to a user equipment, wherein the aggregate uplink resource grant comprises first and second resources scheduled for a transmission by the user equipment, and wherein each of the first and second scheduled resources comprises a plurality of frequency resources for a specified transmission interval, the second scheduled resources comprising different frequency resources than the first scheduled resources; and
means for performing coordinated reception of the transmission at the serving cell with at least one other cell in a cooperating set of cells, wherein the transmission comprises first modulated signals transmitted on the first scheduled resources and second modulated signals transmitted on the second scheduled resources during the specified transmission interval in a single modulation symbol stream, and wherein the serving cell and the at least one other cell are scheduled for reception of the first modulated signals and only one of the serving cell or the at least one other cell is scheduled for reception of the second modulated signals.

61. A cooperating cell, comprising:
means for receiving a notification of an aggregate uplink resource grant to a user equipment, wherein the aggregate uplink resource grant comprises first and second resources scheduled for a transmission by the user equipment, and wherein each of the first and second scheduled resources comprises a plurality of frequency resources for a specified transmission interval, the second scheduled resources comprising different frequency resources than the first scheduled resources; and
means for performing coordinated reception of the transmission at the cooperating cell with at least one other cell in a cooperating set of cells, wherein the transmission comprises first modulated signals transmitted on the first scheduled resources and second modulated signals transmitted on the second scheduled resources during the specified transmission interval in a single modulation symbol stream, and wherein the cooperating cell and the at least one other cell are scheduled for reception of the first modulated signals and only one of the cooperating cell or the at least one other cell is scheduled for reception of the second modulated signals.

* * * * *